United States Patent [19]

Oberth et al.

[11] 4,000,023
[45] Dec. 28, 1976

[54] BONDING AGENTS FOR POLYURETHANE

[75] Inventors: Adolf E. Oberth, Fair Oaks; Rolf S. Bruenner, Orangevale, both of Calif.

[73] Assignee: Aerojet-General Corporation, El Monte, Calif.

[22] Filed: Dec. 9, 1968

[21] Appl. No.: 782,123

[52] U.S. Cl. .................. 149/19.4; 149/20
[51] Int. Cl.² .................................. C06B 45/10
[58] Field of Search ............ 149/19, 76, 19.4, 20

[56] References Cited

UNITED STATES PATENTS

| | | | |
|---|---|---|---|
| 3,141,803 | 7/1964 | Green et al. | 149/19 |
| 3,145,192 | 8/1964 | Perry et al. | 260/77.5 |
| 3,167,589 | 1/1965 | De Lorenzo et al. | 260/583 |
| 3,529,042 | 9/1970 | Lippert | 149/19 X |

*Primary Examiner*—Edward A. Miller
*Attorney, Agent, or Firm*—Edward O. Ansell; Marvin E. Jacobs

[57] ABSTRACT

This patent describes a novel solid rocket propellant comprising a polyurethane binder, a solid ammonium perchlorate oxidizing agent, and an effective bond improving amount of a bonding agent having the general formula:

$$X_2N(CH_2CH_2NX)_nCH_2CH_2NX_2$$

wherein $n$ is an integer and can assume values from 1 to 12, and X is hydrogen, cyanoethyl, hydroxypropyl or mixtures thereof with the proviso that at least one of said X groups is hydrogen.

3 Claims, 1 Drawing Figure

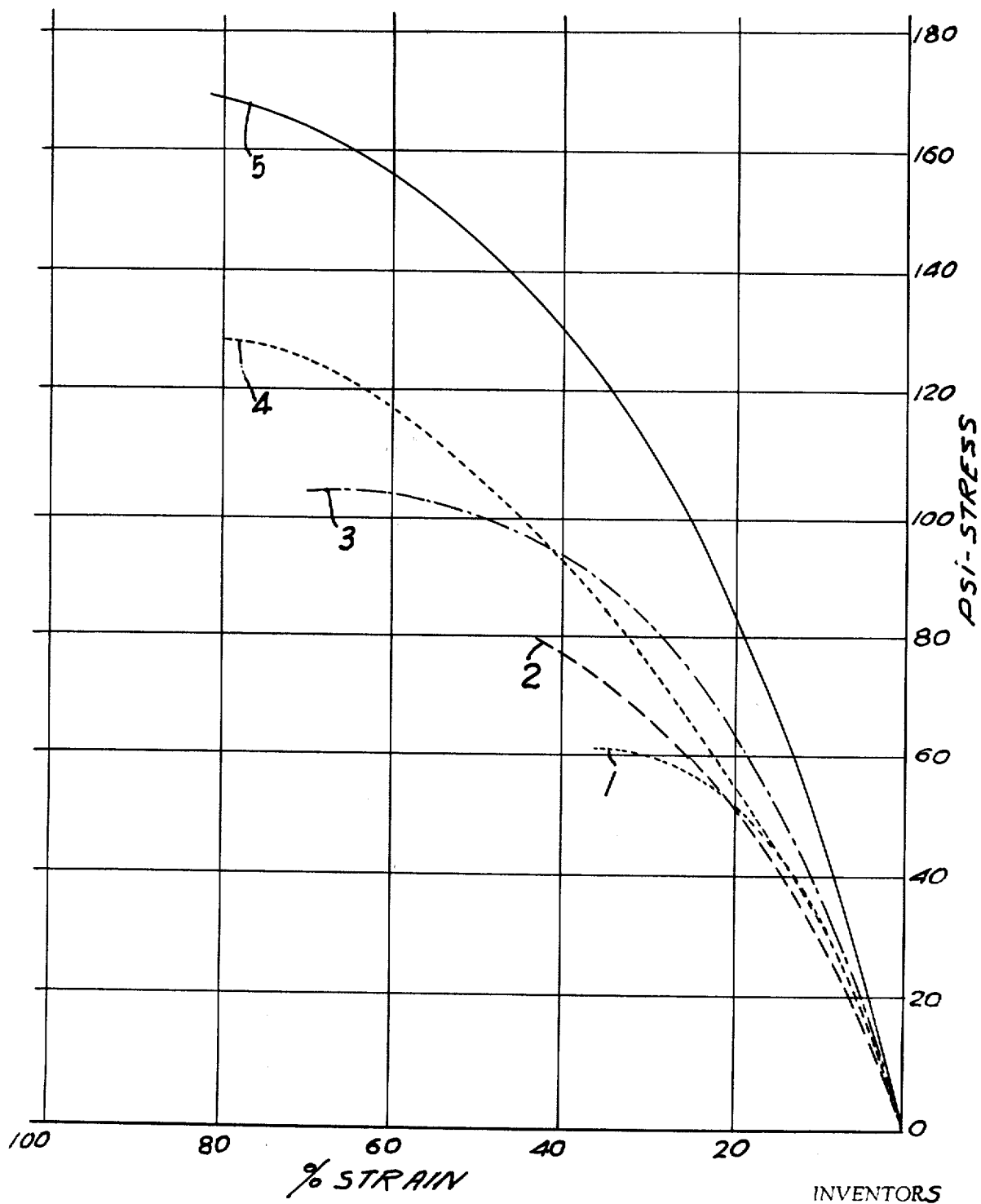

BONDING AGENTS FOR POLYURETHANE

BACKGROUND OF THE INVENTION

Heretofore, it has been proposed to use bonding agents to form a hard and tough binder layer around the filler in a solid rock propellant, the filler normally being the oxidizing agent. This envelope is linked to the binder matrix by primary chemical bonds. In order to accomplish this result, a bonding agent must fulfill the requirements of being adsorbed to the oxidizer surface and of forming a coherent and tough layer. One known bonding agent is 2,3-dihydroxypropyl fix-(2-cyanoethyl) amine. With this bonding agent, the adsorption is accomplished essentially by its insolubility in the binder phase. In propellant binders where 2,3-dihydroxypropyl bis-(2-cyanoethyl) amine is too soluble such as nitroplasticized systems, it becomes inefficient. Similarly, the formation of a tough 2,3-dihydroxypropyl bis-(2-cyanoethyl) amine layer depends on the high reactivity of the hydroxyl groups on the 2,3-dihydroxypropyl bis-(2-cyanoethyl) amine toward the isocyanate, which must be higher than the reactivity of the other alcoholic constituents in the binder matrix. Therefore, in binder systems having very reactive prepolymers, 2,3-dihydroxypropyl bis-(2-cyanoethyl) amine becomes inefficient.

The present invention is believed to represent a substantial advance in the art which overcomes these difficulties.

More specifically, the bonding agents of the present invention do not depend on hydroxyl groups and the ensuing urethane reaction to yield the envelope necessary for bonding, and secondly being strong bases they are chemisorbed as well as adsorbed to the surface of the oxidizing agent.

SUMMARY OF THE INVENTION

This patent describes a novel solid rock propellant comprising a polyurethane binder, a solid ammonium perchlorate oxidizing agent, and an effective bond improving amount of a bonding agent having the general formula:

$$X_2N(CH_2CH_2NX)_nCH_2CH_2NX_2$$

wherein $n$ is an integer and can assume values from 1 to 12, and X is hydrogen, cyanoethyl, hydroxypropyl or mixtures thereof with the proviso that at least one of said X groups is hydrogen.

It is an object of the present invention to provide an improved group of bonding agents for polyurethane-based solid rocket propellants.

More specifically, it is an object of the present invention to provide a bonding agent for solid rocket propellants which does not depend upon hydroxyl groups for bonding effect.

It is also an object of the present invention to provide a novel group of bonding agents for solid rocket propellants which are chemisorbed as well as adsorbed on the surface of the oxidizer.

These and other objects and advantages of this invention will be apparent from the more detailed description which follows.

DESCRIPTION OF PREFERRED EMBODIMENTS

While not bound by any theory, it is believed that the superior bonding provided by the compounds of this invention is due to the fact that not all the amino groups on the tetraethylene pentamine are converted to ammonium groups by the ammonium perchlorate. Thus, some remain available for crosslinking by the diisocyanate. The number of amino groups per molecule polyamine not being converted depends on the total number of $H_2N$-groups and NH-groups on the molecule. Ammonium perchlorate will be decomposed by a base as long as the pH of the mixture is above 4.8. The latter is the pH of an aqueous solution of ammonium perchlorate at equivalence point. With increasing imine content in the molecule this pH is reached at lower degrees of conversion to the ammonium salt. If all amino groups are converted, nothing remains to react with the diisocyanate and neither can the required hard shell be formed nor can it becoeme an integral part of the binder. Table I shows the inefficiency of ethylene diamine and increasing efficiency with increasing number of ethylene imine units in the molecule. Dodecaethylene tridecamine is so viscous that adequate dispersion in the propellant batch becomes a problem. It, thus, establishes the other boundary in between which the useful members of the series lie.

The "bonding power" of tetraethylene pentamine in two representative propellant binder systems is shown in the drawing. It is seen that 2,3-dihydroxypropyl bis-(2-cyanoethyl) amine, the best bonding agent in use so far, is out-performed by tetraethylene pentamine.

In the drawing, curve No. 1 is a polypropylene ether glycol polyurethane propellant containing no bonding agent, and has the composition:

| polypropylene ether glycol | 49.50 Wt. % |
| poly(1,2-propylene oxide)triol | 18.75 Wt. % |
| hexamethylene diisocyanate | 6.75 Wt. % |
| isodecylpelargonate | 25.00 Wt. % |

It is a control. Curve No. 2 is a control for a polybutadiene diol propellant having the following composition:

| HO-terminated polybutadienes from B.F. Goodrich (contains more than two-functional components, so that no additional crosslinker is required | 73.0 Wt. % |
| hexamethylene diisocyanate | 2.0 Wt. % |
| isodecylpelargonate | 25.0 Wt. % |

Curve No. 3 is the same as the propellant of curve No. 1 with 0.125 percent by weight of 2,3-dihydroxypropyl bis-(2-cyanoethyl) amine bonding agent added. Curve No. 4 is the same as the propellant of curve No. 2 with 0.125 percent by weight of tetraethylene pentamine added. Curve No. 5 is the same as the propellant of curve No. 1 with 0.125 percent by weight of tetraethylene pentamine added. In each case, the propellant contained 75 weight percent of ammonium perchlorate.

In general, the bonding agent is used in an effective bonding amount on the order of 0.05 to about 1.0 weight percent based on the total weight of the propellant.

Table I

MECHANICAL PROPERTIES OF POLYPROPYLENE POLYETHER POLYURETHANE BINDER (25%) CONTAINING 0.125% BONDING AGENT AND 74.75% AMMONIUM PERCHLORATE CURED AT 77° F.

| Bonding Agent | $\sigma$, psi | $\epsilon$, % | $E_o$, psi |
|---|---|---|---|
| Control | 49 | 20 | 420 |
| Ethylene diamine | 57 | 43 | 360 |
| Diethylene triamine | 84 | 83 | 236 |
| Tetraethylene pentamine | 147 | 99 | 350 |
| Diethylene triamine (cyanoethyl substituted) $CH_2=CH\text{-}CN$ adduct (diethylene triamine) | 96 | 36 | 480 |
| Tetraethylene pentamine (cyanoethyl substituted) $CH_2=CH\text{-}CN$ adduct (tetraethylene pentamine) | 156 | 95 | 340 |
| Dodecaethylene tridecamine | 135 | 80 | 410* |

*Fuel spots

NOTE: In the above propellants, there was also added an additional 0.125% hexamethylene diisocyanate to react the bonding agent.

Any of the hydrogens of the polyalkylene polyamines can be substituted by either a cyanoethyl or a dihydroxypropyl group. Both reactions are exothermic and proceed immediately upon addition of the reactant. The following two examples illustrate the preparation of these compounds.

EXAMPLE 1

One mole (189 grams) tetraethylene pentamine is put into a 1-liter 3-neck flask, filled with a mechanical stirrer, reflux condenser, thermometer, and an addition funnel. Into the addition funnel are placed 2 moles of acrylonitrile (106grams). While stirring, about 15% of the acrylonitrile are added at once to the amine. After a short while the contents of the flask will get warm (about 80° C). Addition of the remaining acrylonitrile is monitored so as to maintain the temperature of reaction at about 80° C. The resulting syrupy liquid is cyanoethylated tetraethylene pentamine, used without further purification. Yellow, syrupy liquid whichd decomposes on heating and freezes slowly to a glass below −20° C.

EXAMPLE 2

To one mole of tetraethylene pentamine are added 1 to 1.5 moles of glycidol in analogous manner as described above. Product is dihydroxypropyl tetraethylene pentamine, a syrupy liquid used without further purification. Yellow, syrupy liquid which decomposes on heating, and slowly decomposes to a glass below −15° C.

EXAMPLE 3

The following propellant was prepared:

| | Wt. % |
|---|---|
| Ammonium perchlorate | 67 |
| Aluminum powder | 17 |
| β phenyl-napthylamine | 0.05 |
| Sulfur | 0.05 |
| Poly(1,2-butylene oxide) diol | 8.00 |
| 2,3-dihydroxypropyl bis-(2-cyanoethyl) amine | 0.25 |
| Poly(1,2-propylene oxide) triol | 1.50 |
| Toluene diisocyanate | 1.32 |
| Isodecylpelargonate | 3.33 |
| Ferric acetylacetonate | 0.005 |

Properties at 77° F

| $\sigma$, psi | $\epsilon$, % | $E_o$, psi |
|---|---|---|
| 128 | 88 | 440 |

EXAMPLE 4

The following propellant was prepared:

| | Wt. % |
|---|---|
| Ammonium perchlorate | 67 |
| Aluminum powder | 17 |
| β phenyl-napthylamine | 0.05 |
| Sulfur | 0.05 |
| Poly(1,2-butylene oxide) diol | 8.00 |
| Cyanoethyl substituted tetraethylene-pentamine | 0.25 |
| Poly(1,2-propylene oxide) triol | 1.50 |
| Toluene diisocyanate | 1.32 |
| Isodecylpelargonate | 3.33 |
| Ferric acetylacetonate | 0.005 |

Properties at 77° F

| $\sigma$, psi | $\epsilon$, % | $E_o$, psi |
|---|---|---|
| 170 | 45 | 680 |

EXAMPLE 5

The following propellant was prepared:

| | Wt. % |
|---|---|
| Ammonium perchlorate | 55 |
| Aluminum powder | 20 |
| β phenyl-napthylamine | 0.24 |
| Ferric acetylacetonate | 0.03 |
| Bis-dinitropropyl formal | 6.25 |
| Bis-dinitropropyl acetal | 6.25 |
| Diphenyloctyl-phosphate | 2.29 |
| Neopentylglycol azelate-polyester | 5.24 |
| Poly(1,4-butylene oxide) diol | 3.37 |
| Hexanetriol | 0.08 |
| Hexamethylene diisocyanate | 1.25 |

Properties at 77° F

| $\sigma$, psi | $\epsilon$, % | $E_o$, psi |
|---|---|---|
| 102 | 61 | 274 |

EXAMPLE 6

The following propellant was prepared:

| | Wt. % |
|---|---|
| Ammonium perchlorate | 55 |
| Aluminum powder | 20 |
| β phenyl-napthylamine | 0.24 |
| Ferric acetylacetonate | 0.03 |
| Bis-dinitropropyl formal | 6.25 |
| Bis-dinitropropyl acetal | 6.25 |
| Diphenyloctyl-phosphate | 2.085 |
| Neopentylglycol azelate-polyester | 5.24 |
| Poly(1,4-butylene oxide) diol | 3.37 |
| Hexanetriol | 0.08 |
| Hexamethylene diisocyanate | 1.455 |
| 2,3-dihydroxypropyl bis-(2-cyanoethyl) amine | 0.25 |

-continued

| | Wt. % |
|---|---|
| Properties at 77° F | |
| σ, psi | ε, % | E_a, psi |
| 107 | 63 | 295 |

EXAMPLE 7

The following propellant was prepared:

| | Wt. % |
|---|---|
| Ammonium perchlorate | 55 |
| Aluminum powder | 20 |
| β phenyl-napthylamine | 0.24 |
| Ferric acetylacetonate | 0.03 |
| Bis-dinitropropyl formal | 6.25 |
| Bis-dinitropropyl acetal | 6.25 |
| Diphenyloctyl-phosphate | 2.165 |
| Neopentylglycol azelate-polyester | 5.24 |
| Poly(1,4-butylene oxide) diol | 3.37 |
| Hexanetriol | 0.08 |
| Hexamethylene diisocyanate | 1.375 |
| Cyanoethyl substituted tetraethylene-pentamine | 0.25 |
| Properties at 77° F | |
| σ, psi | ε, % | E_a, psi |
| 160 | 60 | 390 |

EXAMPLE 8

The following propellant was prepared:

| | Wt. % |
|---|---|
| Ammonium perchlorate | 55 |
| Aluminum powder | 20 |
| β phenyl-napthylamine | 0.24 |
| Ferric acetylacetonate | 0.03 |
| Bis-dinitropropyl formal | 6.25 |
| Bis-dinitropropyl acetal | 6.25 |
| Diphenyloctyl-phosphate | 2.04 |
| Neopentylglycol azelate-polyester | 5.24 |
| Poly(1,4-butylene oxide) diol | 3.37 |
| Hexanetriol | 0.08 |
| Hexamethylene diisocyanate | 1.375 |
| Dihydroxypropyl substituted tetraethylene pentamine | 0.25 |
| Properties at 77° F | |
| σ, psi | ε, % | E_a, psi |
| 135 | 84 | 236 |

EXAMPLE 9

The following propellant was prepared:

| | Wt. % |
|---|---|
| Ammonium perchlorate | 75 |
| Aluminum powder | 13 |
| 2,3-dihydroxypropyl bis-(2-cyanoethyl) amine | 0.25 |
| HO-terminated polybutadienes from B. F. Goodrich | 6.20 |
| HO-terminated polybutadienes from Sinclair, used as crosslinker | 2.00 |
| Hexamethylene diisocyanate | 0.53 |
| Isodecylpelargonate | 3.02 |
| Properties at 77° F | |
| σ, psi | ε, % | E_a, psi |
| 118 | 22 | 852 |

EXAMPLE 10

The following propellant was prepared:

| | Wt. % |
|---|---|
| Ammonium perchlorate | 75 |
| Aluminum powder | 13 |
| Cyanoethylated tetraethylene pentamine | 0.25 |
| HO-terminated polybutadienes from B. F. Goodrich | 6.20 |
| HO-terminated polybutadienes from Sinclair, used as crosslinker | 2.00 |
| Hexamethylene diisocyanate | 0.53 |
| Isodecylpelargonate | 3.02 |
| Properties at 77° F | |
| σ, psi | ε, % | E_a, psi |
| 138 | 21 | 970 |

EXAMPLE 11

The following propellant was prepared:

| | Wt. % |
|---|---|
| Ammonium perchlorate | 75 |
| Aluminum powder | 13 |
| HO-terminated polybutadienes from B. F. Goodrich | 8.5 |
| Cyanoethylated tetraethylene pentamine | 0.25 |
| Hexamethylene diisocyanate | 0.37 |
| Isodecylpelargonate | 2.88 |
| Properties at 77° F | |
| σ, psi | ε, % | E_a, psi |
| 180 | 70 | 1120 |

EXAMPLE 12

The following propellant was prepared:

| | Wt. % |
|---|---|
| Ammonium perchlorate | 75 |
| Aluminum powder | 13 |
| HO-terminated polybutadienes from Phillips Petroleum | 6.5 |
| HO-terminated, polybutadienes from Sinclair, used as crosslinker | 2.0 |
| Cyanoethylated tetraethylene pentamine | 0.25 |
| Hexamethylene diisocyanate | 0.47 |
| Isodecylpelargonate | 2.78 |
| Properties at 77° F | |
| σ, psi | ε, % | E_a, psi |
| 125 | 73 | 310 |

EXAMPLE 13

The following propellant was prepared:

| | Wt. % |
|---|---|
| Ammonium perchlorate | 68.5 |
| Aluminum powder | 17.0 |
| Sulfur | 0.05 |
| β phenyl-napthylamine | 0.05 |
| Poly(1,4-butylene oxide) diol | 3.37 |
| Neopentylglycol azelate-polyester | 5.24 |
| Hexane triol | 0.08 |
| Tetraethylene pentamine | 0.25 |
| Hexamethylene diisocyanate | 1.45 |
| Isodecylpelargonate | 4.01 |
| Properties at 77° F | |
| σ, psi | ε, % | E_a, psi |
| 173 | 60 | 750 |

EXAMPLE 14

The following propellant was prepared:

| | Wt. % |
|---|---|
| Ammonium perchlorate | 68.5 |
| Aluminum powder | 17.0 |
| Sulfur | 0.05 |
| β phenyl-napthylamine | 0.05 |
| Poly(1,4-butylene oxide) diol | 3.37 |
| Neopentylglycol azelate-polyester | 5.24 |
| Hexane triol | 0.08 |
| Cyanoethylated tetraethylene pentamine | 0.25 |
| Hexamethylene diisocyanate | 1.325 |
| Isodecylpelargonate | 4.135 |

| Properties at 77° F | | |
|---|---|---|
| σ, psi | ε, % | E$_a$, psi |
| 170 | 76 | 665 |

EXAMPLE 15

The following propellant was prepared:

| | Wt. % |
|---|---|
| Ammonium perchlorate | 68.5 |
| Aluminum powder | 17.0 |
| Sulfur | 0.05 |
| β phenyl-naphthylamine | 0.05 |
| Poly(1,4-butylene oxide) diol | 3.37 |
| Neopentylglycol azelate-polyester | 5.24 |
| Hexane triol | 0.08 |
| Dihydroxypropyl substituted tetraethylene pentamine | 0.25 |
| Hexamethylene diisocyanate | 1.45 |
| Isodecylpelargonate | 4.01 |

| Properties at 77° F | | |
|---|---|---|
| σ, psi | ε, % | E$_a$, psi |
| 225 | 70 | 835 |

The present invention is applicable to all types of ammonium perchlorate-containing solid propellants including those having polymeric binders derived from polyether-diols, -triols etc., and polybutadiene-diols, -triols etc. with isocyanates as curatives (polyurethanes). The propellants may contain fuels such as aluminum, plasticizers, stabilizers and the like. Many propellant formulations and their processing techniques are disclosed in assignee's prior U.S. Pat. No. 3,340,111, the disclosure of which is expressly incorporated herein by reference.

Having fully described the invention, it is intended that it be limited only by the lawful scope of the appended claims.

We claim:

1. A novel solid rocket propellant comprises a polyurethane binder, ammonium perchlorate oxidizing agent, and an effective bond improving amount of cyanoethyl substituted tetraethylene pentamine.

2. A novel solid rocket propellant comprises a polyurethane binder, ammonium perchlorate oxidizing agent, and an effective bond improving amount of dihyrdoxypropyl tetraethylene pentamine.

3. A novel solid rocket propellant comprises a polyurethane binder, ammonium perchlorate oxidizing agent, and an effective bond improving amount of dihydroxptopyl, cyanoethyl tetraethylene pentamine.

* * * * *

UNITED STATES PATENT AND TRADEMARK OFFICE
CERTIFICATE OF CORRECTION

PATENT NO. : 4,000,023
DATED : December 28, 1976
INVENTOR(S) : Adolf E. Oberth and Rolf S. Bruenner It is certified that error appears in the above-identified patent and that said Letters Patent are hereby corrected as shown below:

Column 1, line 7, change "rock" to -- rocket --
Column 1, line 13, change "fix" to -- bis --
Column 1, line 42, change "rock" to -- rocket --

Column 2, line 20, change "becoeme" to -- become --
Column 2, line 36, change "and" to -- the binder of which --
Column 2, line 45, change "having" to --, the binder of which has
Column 2, line 51, after "required", add -- ) --

Column 3, line 39, change "whichd" to -- which --

Column 8, line 33, change "droxyptopyl" to --droxypropyl --

Signed and Sealed this

Seventh Day of June 1977

[SEAL]

Attest:

RUTH C. MASON
*Attesting Officer*

C. MARSHALL DANN
*Commissioner of Patents and Trademarks*